H. G. IMHOFF.
PNEUMATIC TIRE.
APPLICATION FILED FEB. 5, 1916. RENEWED MAY 10, 1919.
1,312,482. Patented Aug. 5, 1919.
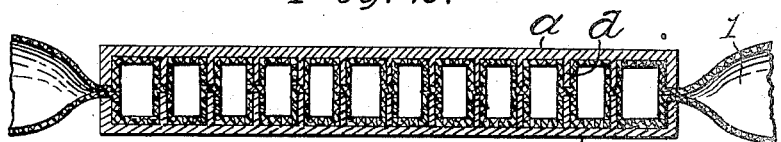
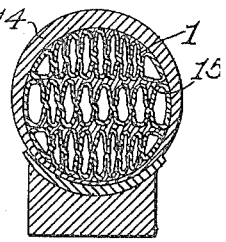
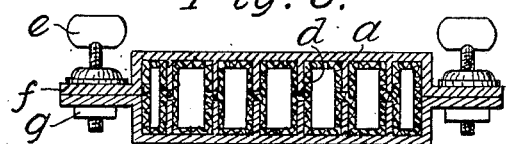
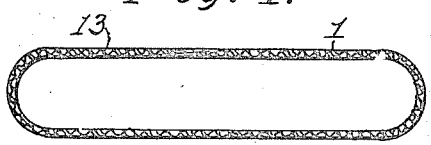
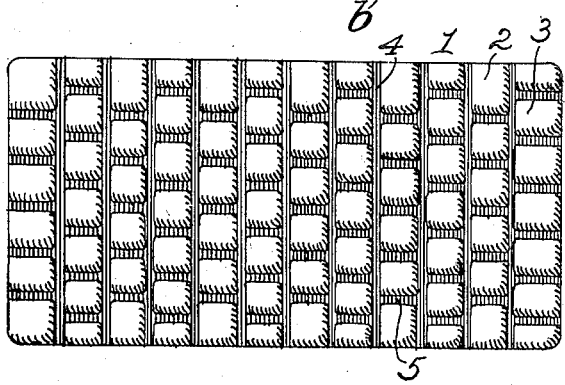
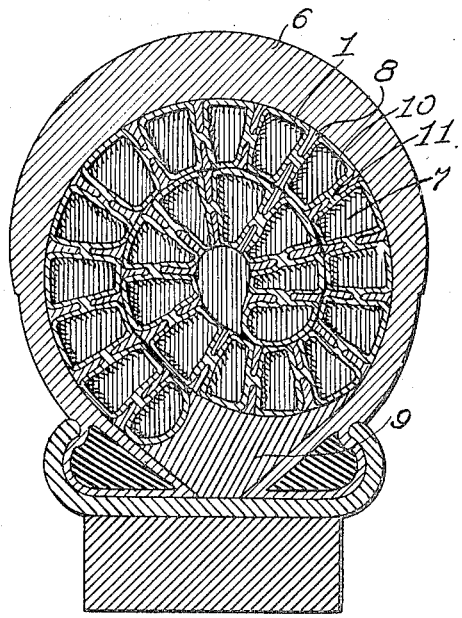
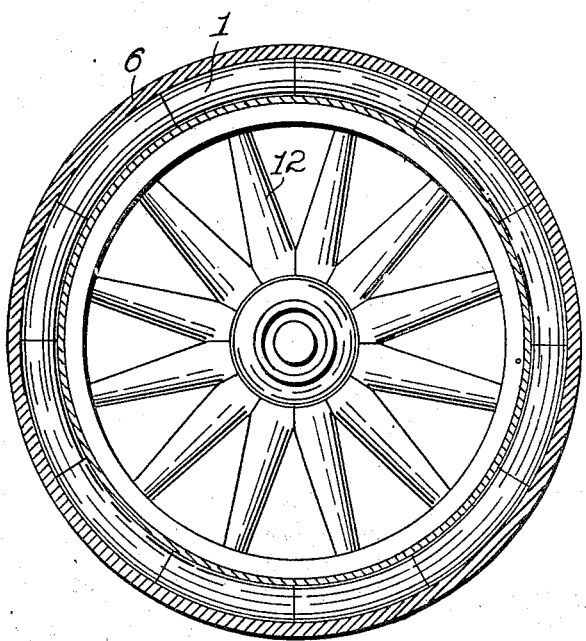
Inventor,
H. G. Imhoff, by
G. C. Kennedy,
Attorney.

UNITED STATES PATENT OFFICE.

HARRY G. IMHOFF, OF WATERLOO, IOWA.

PNEUMATIC TIRE.

1,312,482.   Specification of Letters Patent.   Patented Aug. 5, 1919.

Application filed February 5, 1916, Serial No. 76,450. Renewed May 10, 1919. Serial No. 296,126.

*To all whom it may concern:*

Be it known that I, HARRY G. IMHOFF, a citizen of the United States of America, and a resident of Waterloo, Blackhawk county, Iowa, have invented certain new and useful Improvements in Pneumatic Tires, of which the following is a specification.

My invention relates to improvements in pneumatic fillers for resilient tire casings, and the object of my improvement is to provide such a filler with a cellular or chambered structure, whose closed cells or chambers are filled with air under compression, to properly elastically expand a tire casing, while effectually preventing blow-outs and suspension of use of the casing.

This object I have accomplished by the means which are hereinafter described and claimed, and which are illustrated in the accompanying drawings, in which:

Figure 1 is a transverse section of an uninflated soft rubber tube prior to its treatment for forming it into my improved filler structure.

Fig. 2 is a longitudinal section of a portion of said tube as acted upon by a pair of coacting clamping-molds before and while undergoing the first stage of vulcanization.

Fig. 3 is a transverse section of the structures shown in said Fig. 2.

Fig. 4 is a plan of one of the filler bodies after having been vulcanized.

Fig. 5 is a cross-section of a wheel-rim, tire-casing mounted thereon, and of my improved filler as seated in said casing.

Fig. 6 is an elevation, on a reduced scale, of a wheel, rim, and tire-casing containing my improved filler bodies, the rim and casing being shown in section, and Fig. 7 is a cross-section of my pneumatic bodies overlaid and used as a tire.

Similar numerals of reference denote corresponding parts throughout the several views.

It is well known that the ordinary type of pneumatic filler for a resilient tire-casing is a soft vulcanized endless rubber tube filled with air under compression, and that a puncture which traverses both the casing and the said inner tube will cause a blow-out which wrecks the usefulness of both the filler and casing, causing delay and expense in removing these parts and in replacing them *en route*.

My pneumatic casing-filler as a new article of manufacture, obviates both these inconveniences, because it is formed with a large number of uncommunicating chambers of relatively small dimensions filled with compressed air, and may be in separate bodies or sections. In case the casing and filler is punctured, no blow-out and wrecking can occur, since but one or two small cavities of the filler are emptied of air, which in no way affects the usefulness or stability of the rest of the filler. In other words, a journey may be proceeded with; no delay accrues, and at the journey's end, the tire and filler is not incapacitated for further use without need for removal or repairs.

In the improbable case that one section becomes torn with several punctures, it may be readily replaced at a small cost, but adjacent sections will remain inflated to carry the tire to the journey's end with but little loss in resiliency and supporting power.

In Fig. 1 is shown a transverse section of soft reinforced rubber tube, prior to vulcanization, and formed of a strip of rubber reinforced at 13 and with longitudinal edges overlapped and united cohesively.

I do not, in this application, claim anything relative to the apparatus employed in filling the tube 1 with compressed air, forming it into a chambered structure, and holding it until properly vulcanized, for these stages of progession in the process of formation of the filler body may be performed by any suitable means. However, I proceed to fill the tube 1 with compressed air after one end has been closed, then clamp it in a forming mold *b* composed of two like halves having alined inner ribs *d*, by means of thumb-screws *e* and nuts *g* working through registering orifices in pairs of side lugs *f*. This pushes the tube walls into contact between said ribs, so as to cohesively unite, forming cellular connections 11 between cells 7, each filled with compressed air, whose walls 10 are pressed and formed against the inner walls of the mold, to present the outer appearance shown in said Fig. 4, where the projecting cell walls are separated by narrow transverse grooves 4 and intersecting longitudinal grooves 5. In practice, the cells 7 may be arranged in a staggered relation, as shown in Fig. 4, which may limit puncture of the cells to a minimum, but may be placed otherwise as desired.

When the mold-parts have thus been clamped upon the tube 1, the latter may be trimmed off at each end of the mold, and then subjected to vulcanization.

Then the grooves 4 and 5 may be filled with soft unvulcanized rubber at 8, the body 1 then rolled spirally upon itself as shown in Fig. 5, and the gap at 9 filled in with a mass of unvulcanized rubber, the whole then being subjected to re-vulcanization. The solid rubber part 9 then is of a wedge-like form adapted to seat itself fittingly between the beads of the tire-casing 6, after a sufficient number of sections 1 have been placed in the tire of the wheel 12. The filler may, of course, if desired, be made in a single piece, sufficient to alone fill the tire-casing.

In Fig. 7 is shown my device itself used alone as a tire, and fitted upon a rim for that purpose. In this case, a pad such as is shown in Fig. 4 is cut into several parts along lines of the transverse connections 4, the parts then placed in a pile and cemented or connected together by unvulcanized rubber and an outer coating 14 of rubber overlaid upon them, thickened at the tread, and then revulcanized to form an integral structure. This is very suitable for light or bicycle tires.

The sections 1 shown in Fig. 6, are of arc-shaped curvature to fit the annular cavity of the casing 6, and caused by mold pressure in the process of revulcanization.

It is to be understood that any modification embracing the principles of this invention is protected by the scope thereof, that is to say, the filler may be in a single body adapted to be seated in a hollow tire-casing, or it may be employed itself as a tire without any casing; and furthermore, that it may be constructed of other materials than rubber, such as leather, air-proof textiles or other elastic substances or a combination of different materials and having its chambers otherwise connected. The principle of this invention is the use of a chambered body, whose cells are filled with compressed air or other elastic fluids, and the elasticity and compressibility of the fluid is made use of rather than any specific resiliency in the containing body. Also the pneumatic pads thus formed may be easily subdivided along the elastic connections, or may be used for other purposes than tire-fillers, such as in cushions or as resilient supporting-means.

Having described my invention, what I claim as new, and desire to secure by Letters Patent, is:

1. As a new article of manufacture, an elastic body having numerous chambers, whose chambers are filled with an elastic fluid, wound spirally upon itself to form a roll adapted for insertion in a hollow resilient tire-casing, and a bond securing the overlapping part of the roll to the roll, formed as a longitudinal extension adapted to close the space between the bead parts of the tire-casing, when the roll is used as a filler for the casing.

2. As a new article of manufacture, a cylindrical filler for an elastic tire-casing comprising an elastic cellular structure rolled upon itself and having an elastic rib adapted to be seated fittingly in the interspace of the casing-beads and the rim on which the casing is mounted.

Signed at Waterloo, Iowa, this 25th day of Jan., 1916.

HARRY G. IMHOFF.